(12) United States Patent
Ju

(10) Patent No.: US 6,768,524 B2
(45) Date of Patent: Jul. 27, 2004

(54) CONDUCTIVE LCD CUSHION FOR WIRELESS MOBILE COMMUNICATION TERMINAL AND METHOD FOR MANUFACTURING THE SAME

(76) Inventor: Sung Suk Ju, 756-7 Visan 2-dong, DongAn-Ku, AnYang City, KyungKi-Do (KR)

( * ) Notice: Subject to any disclaimer, the term of this patent is extended or adjusted under 35 U.S.C. 154(b) by 0 days.

(21) Appl. No.: 10/131,708

(22) Filed: Apr. 24, 2002

(65) Prior Publication Data

US 2002/0159000 A1 Oct. 31, 2002

(30) Foreign Application Priority Data

Apr. 25, 2001 (KR) ........................................ 2001-22504

(51) Int. Cl.⁷ ............................................. G02F 1/1333
(52) U.S. Cl. ........................ 349/59; 349/56; 174/35 R
(58) Field of Search ............................ 349/56, 59, 187; 174/35 R

(56) References Cited

U.S. PATENT DOCUMENTS

| | | | |
|---|---|---|---|
| 4,482,580 A | * 11/1984 | Emmett et al. | ............... 427/66 |
| 4,960,642 A | * 10/1990 | Kosuga et al. | ............... 428/407 |
| 5,002,368 A | 3/1991 | Anglin | |
| 5,075,824 A | 12/1991 | Tan | |
| 5,166,814 A | 11/1992 | Jacobs et al. | |
| 5,755,915 A | * 5/1998 | Yamamoto | ................... 156/285 |
| 6,515,223 B2 | * 2/2003 | Tashjian | ................... 174/35 R |

FOREIGN PATENT DOCUMENTS

JP 11330778 * 11/1999 ............ H05K/9/00

* cited by examiner

Primary Examiner—Tarifur R. Chowdhury
Assistant Examiner—Jeanne Andrea Di Grazio
(74) Attorney, Agent, or Firm—Needle & Rosenberg, P.C.

(57) ABSTRACT

Disclosed is an LCD cushion for a wireless mobile communications terminal, intervened between an LCD and an outer case to resiliently support the LCD against the outer case. The LCD cushion is manufactured by impregnating contractible fibers with a conductive material to prepare functional fabric pieces having shock absorbability and conductivity including a horizontal resistance of no greater than 1.0 Ω and a vertical resistance of no greater than 1.0 Ω, integrally laminating selected functional fabric pieces into 1 to 4 layers having a total thickness of no greater than 1 mm using a conductive sticking agent, and then heat-fusion finishing an upper surface and inner cut edges of the resultant laminated combination.

5 Claims, 3 Drawing Sheets

FIGURE 3

```
         ┌─────────┐
         │  START  │
         └─────────┘
              ↓
┌──────────────────────────────────────────┐
│ Manufacturing functional fabric pieces by│
│ impregnating contractible fibers with    │
│ a conductive metal                       │
└──────────────────────────────────────────┘
              ↓
┌──────────────────────────────────────────┐
│ Selecting and integrally laminating 1 to 4│
│ functional fabric pieces using a conductive│
│ sticking agent                           │
└──────────────────────────────────────────┘
              ↓
┌──────────────────────────────────────────┐
│ Defining a desired shape employing an    │
│ automatic die cutting machine            │
└──────────────────────────────────────────┘
              ↓
┌──────────────────────────────────────────┐
│ Heat-fusion finishing an upper           │
│ surface and cut edges                    │
└──────────────────────────────────────────┘
              ↓
         ┌─────────┐
         │   END   │
         └─────────┘
```

CONDUCTIVE LCD CUSHION FOR WIRELESS MOBILE COMMUNICATION TERMINAL AND METHOD FOR MANUFACTURING THE SAME

BACKGROUND OF THE INVENTION

This application claims priority to Korean Patent Application No. 2001-22504 filed Apr. 25, 2001, which application is herein incorporated by reference in its entirety.

1. Field of the Invention

The present invention relates to a conductive LCD (liquid crystal display) cushion for a wireless mobile communication terminal and a method for manufacturing the same. More particularly, the present invention relates to a conductive LCD cushion for a wireless mobile communication terminal, which simultaneously has shock absorbability capable of resiliently supporting an LCD and conductivity capable of absorbing and shutting off static electricity and electromagnetic waves, and a method for manufacturing the same.

2. Description of the Related Art

As well known in the art, a digital type wireless mobile communication terminal is necessarily provided with an LCD for displaying numbers, characters and symbols. Between the LCD and a surrounding structure, there is intervened an LCD cushion made of rubber or polyurethane to resiliently support the LCD.

These days, as dangerousness of deleterious electromagnetic waves has been recognized, there is a tendency to enact legislation against deleterious electromagnetic waves and thereby strictly restrict excessive, emission of deleterious electromagnetic waves in a wireless mobile communication terminal. In this regard, in the conventional art, a conductive material is applied to an inner surface of an outer case of a wireless mobile communication terminal to absorb or shut off deleterious electromagnetic waves to some extent. In a wireless mobile communication terminal, since internal circuits are directly faces the outside around an LCD, a great amount of deleterious electromagnetic waves is generated around the LCD. Due to this fact, development of an arrangement or a method for effectively absorbing or shutting off deleterious electromagnetic waves around the LCD is drawing considerable attention.

While having shock absorbability, the conventional LCD cushion made of rubber or polyurethane suffers from defects in that, since it can hardly absorb or shut off static electricity or deleterious electromagnetic waves, the human body cannot but be fully exposed to the static electricity or deleterious electromagnetic waves which are generated by the internal circuits and emitted to the outside through between the LCD and a surrounding structure. In this connection, although the conductive material is coated on or attached to the outer case of the terminal to absorb or shut off static electricity or deleterious electromagnetic waves to some extent, it is impossible to completely absorb or shut off static electricity or deleterious electromagnetic waves emitted from the LCD.

In consideration of these facts, while it is required that the LCD cushion is made of a conductive material capable of absorbing or shutting off static electricity or deleterious electromagnetic waves, since the conventional conductive materials have inferior shock absorbability and formability, direct application thereof cannot but be restricted in practice.

SUMMARY OF THE INVENTION

Accordingly, the present invention has been made in an effort to solve the problems occurring in the related art, and an object of the present invention is to provide a conductive LCD cushion for a wireless mobile communication terminal, which is manufactured by preparing functional fabric pieces through impregnating fibers with a conductive material and integrally laminating several functional fabric pieces using a conductive sticking agent to obtain a desired height and formability and then by forming the resultant laminated combination to a desired shape, in such a way as to simultaneously render shock absorbability and conductivity, whereby it can properly perform its function and at the same time can absorb or shut off static electricity or deleterious electromagnetic waves emitted between an LCD and a surrounding structure, and a method for manufacturing the same.

In order to achieve the above object, according to the present invention, there is provided an LCD cushion for a wireless mobile communications terminal, intervened between an LCD and an outer case to resiliently support the LCD against the outer case, wherein the LCD cushion is manufactured by impregnating contractible fibers with a conductive material to prepare functional fabric pieces having shock absorbability and conductivity including a horizontal resistance of no greater than 1.0 Ω and a vertical resistance of no greater than 1.0 Ω, integrally laminating selected functional fabric pieces into 1 to 4 layers having a total thickness of no greater than 1 mm using a conductive sticking agent, and then heat-fusion finishing an upper surface and inner cut edges of the resultant laminated combination.

BRIEF DESCRIPTION OF THE DRAWINGS

The above objects, and other features and advantages of the present invention will become more apparent after a reading of the following detailed description when taken in conjunction with the drawings, in which:

FIGS. 2(a) through 2(h) are cross-sectional views illustrating various conductive LCD cushions for a wireless mobile communication terminal according to the present invention, wherein FIG. 2(a) shows only one layer of a woven or non-woven fabric, FIG. 2(b) two layers formed of woven and non-woven fabrics, FIG. 2(c) three layers formed of woven, non-woven and woven fabrics, FIG. 2(d) three layers formed of woven, knit and woven fabrics, FIG. 2(e) three layers formed of woven, knit and non-woven fabrics, FIG. 2(f) four layers formed of woven, knit, knit and non-woven fabrics, FIG. 2(g) four layers formed of woven, knit, knit and knit fabrics, and FIG. 2(h) four layers formed of woven, non-woven, knit and non-woven fabrics; and FIG. 3 is a flow chart for explaining a method for manufacturing the conductive LCD cushion for a wireless mobile communication terminal according to the present invention.

DETAILED DESCRIPTION OF PREFERRED EMBODIMENTS

Figure 1:
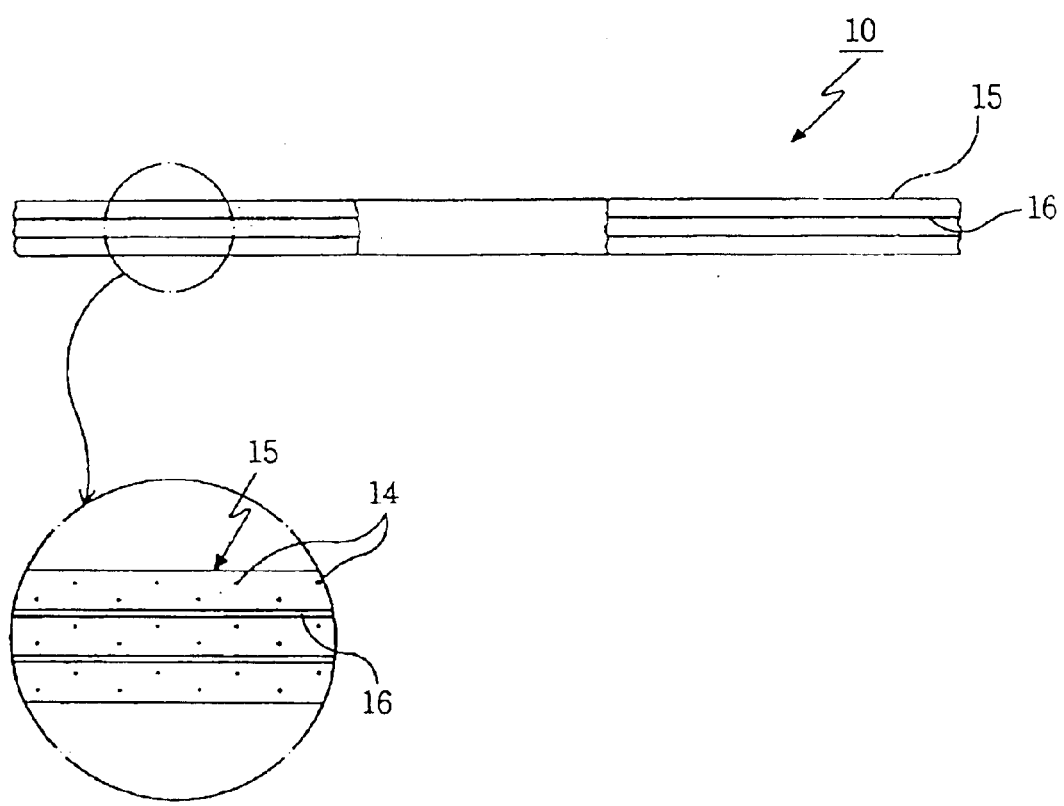
FIG. 1 is a partially enlarged cross-sectional view illustrating a conductive LCD cushion for a wireless mobile communication terminal in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Referring to FIG. 1, an LCD cushion for a wireless mobile communication terminal in accordance with an embodiment of the present invention, designated by the reference numeral 10, is manufactured by impregnating fibers such as a woven fabric 11, a non-woven fabric 12 and a knit fabric 13, with a conductive material 14 such as nickel, to prepare functional fabric pieces 15, integrally laminating selected functional fabric pieces 15 into 1 to 4 layers using a conductive sticking agent 16, and then heat-fusion finishing an upper surface and outer and inner cut edges of the resultant laminated combination. The LCD cushion 10 is intervened between an LCD (not shown) of the wireless mobile communication terminal and an outer case (not shown) to resiliently support the LCD against the outer case.

Upon manufacturing the LCD cushion 10 according to the present invention, as shown in FIG. 3, a metallic paint containing the conductive material 14 such as nickel is first sprinkled over the contractible fibers such as the woven fabric 11, the non-woven fabric 12 and the knit fabric 13, and then, dried to allow the contractible fibers to be naturally impregnated with the conductive material 14. Hereafter, the contractible fibers impregnated with the conductive material 14 are referred to as the functional fabric pieces 15.

One to three of these functional fabric pieces 15 are selected and then integrally laminated using the conductive sticking agent 16. The conductive sticking agent 16 contains a conductive substance to achieve conductivity while permitting the functional fabric pieces 15 to stick to each other. Therefore, by integrally laminating 1 to 3 of the functional fabric pieces 15 into 1 to 4 layers using the conductive sticking agent 16, the resultant laminated combination has a conductive property. At this time, conductivity of the LCD cushion 10 is set to have a horizontal resistance of no greater than 1.0 Ω and a vertical resistance of no greater than 1.0 Ω. A total thickness of the resultant laminated combination is set to be no greater than 1 mm in consideration of a narrow space defined between the LCD and the outer case.

Horizontal electrical conduction, which is also referred to as "surface electrical conduction," means electrical conduction at the surface of an object. Where the surface of an abject is made of a material having a conductivity, current can flow horizontally along the surface of the object. In this case, the horizontal resistance exhibited at the object surface is very low.

On the other hand, vertical electrical conduction, which is also referred to an "up-down electrical conduction," means electrical conduction between upper and lower ends of an object. Where the upper and lower ends of an object are connected by a material having a conductivity, current can flow vertically through the object. In this case, the vertical resistance exhibited in the object is very low.

Since the conductive LCD cushion according to the present invention has a horizontal resistance (an electrical resistance exhibited between the upper and lower ends of the cushion) of no greater than 1.0 Ω and a vertical resistance (an electrical resistance exhibited between two optional points on a horizontal surface of the cushion) of no greater than 1.0 Ω, it may be appreciated that excellent horizontal and vertical electrical conduction are achieved in the conductive LCD cushion according to the present invention. Where such a conductive LCD cushion, in which excellent horizontal and vertical electrical conduction are achieved, is applied to a wireless mobile communication terminal, it is possible to completely shut off deleterious electromagnetic waves or static electricity, flowing toward the LCD cushion after being generated from internal circuits, by the LCD cushion.

No horizontal or vertical electrical conduction in an object means that the object exhibits a high horizontal or vertical resistance. Where such an object is used for the LCD cushion of a wireless communication terminal, it is impossible to completely shut off deleterious electromagnetic waves or static electricity by the LCD cushion. In this case, deleterious electromagnetic waves or static electricity may leak outwardly through the LCD. Thus, it may be appreciated that horizontal and vertical electrical conduction are important in LCD cushions.

Figure 2:
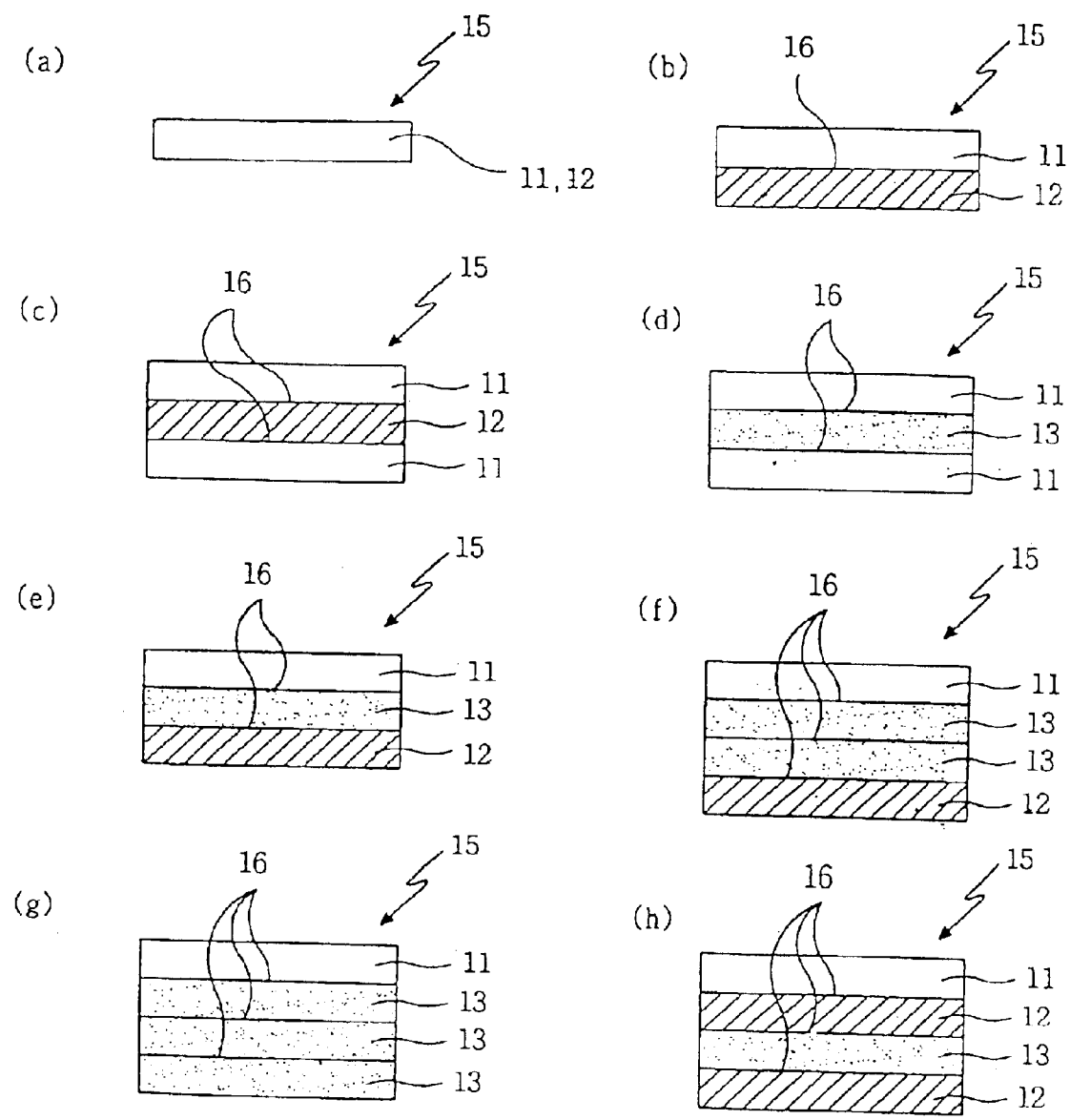

The functional fabric pieces 15 comprise the woven fabric 11, the non-woven fabric 12, the knit fabric 13, and the like. Thus, it would be preferable to select 1 to 3 of the functional fabric pieces 15 to accomplish maximum shock absorbability and conductivity with a minimum thickness, by considering characteristics of the respective fibers depending upon a kind of a wireless mobile communication terminal. Examples of the resultant laminated combination are shown in FIGS. 2(*a*) through 2(*h*).

By integrally laminating the functional fabric pieces 15, it is possible to accomplish formability and shock absorbability which are no less than those of the conventional LCD cushion made of rubber or polyurethane. As a consequence, by inputting the laminated combination into an automatic die cutting machine, the laminated combination can be precisely cut into an already programmed shape which corresponds to an actual shape of the LCD of the wireless mobile communication terminal.

If the cutting process is completed, in order to uniformize functionability of the resultant combination and remove contaminants such as fiber debris, dust, and the like, an upper surface and cut edges of the resultant combination are heat-fusion finished. In other words, the upper surface and outer cut edges of the resultant cut combination are primarily heat-fusion finished for 0.2~0.5 seconds, while moving a small-sized flame projector. Then, inner cut edges of the resultant combination are secondarily heat-fusion finished, employing an electric soldering gun, so that an inner outline of the resultant combination is not changed and only a surface thereof is slightly fused. By doing these, it is possible to manufacture the LCD cushion 10 which simultaneously has shock absorbability capable of resiliently supporting the LCD against the outer case and conductivity capable of absorbing or shutting off static electricity or deleterious electromagnetic waves.

As apparent from the above description, the conductive LCD cushion for a wireless mobile communication terminal, according to the present invention, provides advantages in that, since it is manufactured by preparing functional fabric pieces through impregnating contractible fibers with a conductive material and selecting 1 to 3 functional fabric pieces and integrally laminating the selected functional fabric piece or pieces into 1 to 4 layers using a conductive sticking agent, superior formability is accomplished and thereby it is possible to precisely define a desired shape employing an automatic die cutting machine. Also, because the conductive LCD cushion according to the present invention has a thickness of no greater than 1 mm, it can be adequately disposed in a narrow space between an LCD and an outer case. Further, the conductive LCD cushion according to the present invention has shock absorbability capable of resiliently supporting the LCD against the outer case. Moreover, the conductive LCD cushion according to the present invention can absorb or shut off static electricity or deleterious electromagnetic waves emitted between the LCD and the outer case, thereby improving communication quality of the wireless mobile communication terminal and not adversely influencing health of a user.

Furthermore, due to the fact that the conductive LCD cushion according to the present invention can have the same size, shape and weight as the conventional LCD cushion, it can be applied in practice without modifying the existing configuration of the conventional wireless mobile communication terminal.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for manufacturing an LCD cushion for a wireless mobile communication terminal, comprising the steps of:
   (a) impregnating contractible fibers with a paint containing a conductive material to prepare functional fabric pieces having shock absorbability and conductivity including a horizontal resistance of no greater than 1.0 $\Omega$ and a vertical resistance of no greater than 1.0 $\Omega$;
   (b) selecting 1 to 3 functional fabric pieces and integrally laminating the selected functional fabric piece or pieces into 1 to 4 layers having a total thickness of no greater than 1 mm, using a conductive sticking agent;
   (c) cutting the resultant laminated combination of the functional fabric pieces, employing an automatic die cutting machine, to define a shape which corresponds to that of an LCD of the wireless mobile communication terminal;
   (d) primarily heat-fusion finishing an upper surface and outer cut edges of the resultant cut combination for 0.2~0.5 seconds, while moving a small-sized flame projector; and
   (e) secondarily heat-fusion finishing inner cut edges of the resultant combination which is primarily heat-fusion finished on its upper surface and outer cut edges, employing an electric soldering gun, so that an inner outline of the resultant combination is not changed and only a surface thereof is slightly fused.

2. An LCD cushion for a wireless mobile communication terminal, comprising:
   a first functional fabric piece having an upper surface and a lower surface,
   wherein the first functional fabric piece comprises contractible fibers impregnated with a conductive material and has shock absorbability and conductivity including a horizontal resistance of no greater than 1.0 $\Omega$ and a vertical resistance of no greater than 1.0 $\Omega$,
   wherein the LCD cushion has a heat-fusion finished upper surface and outer and inner cut edges and a total thickness of no greater than 1 mm.

3. The LCD cushion of claim 2, further comprising:
   a second functional fabric piece having an upper surface and a lower surface,
   wherein the second functional fabric piece comprises contractible fibers impregnated with a conductive material and has shock absorbability and conductivity including a horizontal resistance of no greater than 1.0 $\Omega$ and a vertical resistance of no greater than 1.0 $\Omega$,
   wherein the upper surface of the second functional fabric piece is integrally laminated to the lower surface of the first functional fabric piece using a conductive sticking agent.

4. The LCD cushion of claim 3, further comprising:
   a third functional fabric piece having an upper surface and a lower surface,
   wherein the third functional fabric piece comprises contractible fibers impregnated with a conductive material and has shock absorbability and conductivity including a horizontal resistance of no greater than 1.0 $\Omega$ and a vertical resistance of no greater than 1.0 $\Omega$,
   wherein the upper surface of the third functional fabric piece is integrally laminated to the lower surface of the second functional fabric piece using a conductive sticking agent.

5. The LCD cushion of claim 4, further comprising:
   a fourth functional fabric piece having an upper surface and a lower surface,
   wherein the fourth functional fabric piece comprises contractible fibers impregnated with a conductive material and has shock absorbability and conductivity including a horizontal resistance of no greater than 1.0 $\Omega$ and a vertical resistance of no greater than 1.0 $\Omega$,
   wherein the upper surface of the fourth functional fabric piece is integrally laminated to the lower surface of the third functional fabric piece using a conductive sticking agent.

* * * * *